United States Patent [19]
Tremaine et al.

[11] 4,096,426
[45] Jun. 20, 1978

[54] NON-LINEAR ERROR SIGNAL ATTENUATOR FOR SERVO SYSTEM

[75] Inventors: Brian P. Tremaine; Charles E. Mendenhall, both of San Jose, Calif.

[73] Assignee: Sperry Rand Corporation, New York, N.Y.

[21] Appl. No.: 712,717

[22] Filed: Aug. 9, 1976

[51] Int. Cl.² .................................................. G05B 5/01
[52] U.S. Cl. ................................... 318/611; 318/615
[58] Field of Search ............... 318/611, 615, 616, 617

[56] References Cited
U.S. PATENT DOCUMENTS

| | | | |
|---|---|---|---|
| 2,989,673 | 6/1961 | Westheimer | 318/611 X |
| 3,241,015 | 3/1966 | Allen | 318/615 |
| 3,366,856 | 1/1968 | Sawano | 318/615 X |
| 3,852,650 | 12/1974 | Mazuzawa et al. | 318/615 X |

Primary Examiner—B. Dobeck
Attorney, Agent, or Firm—Gerald L. Moore

[57] ABSTRACT

A servo system incorporating an attenuator for reducing the error signal an amount proportional to the magnitude of the error signal so as to minimize overshoot without affecting the stability in the system.

4 Claims, 3 Drawing Figures

NON-LINEAR ERROR SIGNAL ATTENUATOR FOR SERVO SYSTEM

BACKGROUND OF THE INVENTION

In servo systems there is usually desired a maximum response to the error signal to accelerate movement of the movable member to a desired position. Thus it is desirable to increase the gain of the system as much as possible to create a minimum position offset due to external disturbances. With a high gain a system is defined as being stiff, that is, a very small position error results in a large force tending to return the movable member to the desired position. However with such a high gain system, there is loss in dynamic stability, that is, due to mechanical resonances or other outside influences, such a system is more likely to continue to seek and never settle at the desired position.

In addition, there occurs in such stiff systems the phenomena known as overshoot. This phenomena results from accelerating the movable member towards the desired position due to the high magnitude error signal such that the resulting velocity is too high for the member to be stopped at the desired position. Thus there results movement of the member past the desired location commonly referred to as overshooting. Such overshooting can occur to the extent of resulting in resonance of the circuit tending to continually shift the movable member back and forth across the desired position.

As stiffness in a servo system is reduced however, that is, the gain is diminished such that a smaller error signal results from a position displacement, there tends to be less overshoot and greater stability in the system but the response time necessary for shifting the movable member towards the desired position is increased. Such occurs because the less gain in the system results in a smaller position error signal for a displacement of the movable member from the desired position. Thus there is a tradeoff between the dynamic stability of a servo system and the stiffness in operation of that system.

One method of providing stiffness in such a servo system while limiting overshoot is to provide dual feedbback paths for the error signal. One feedback path is primarily resistive thereby transmitting a signal directly responsive to the error signal. A parallel feedback path is provided which serves to generate a derivative of the error signal thereby rendering a signal responsive to the velocity of the movable member. By using the velocity signal to diminish the position error signal, the resulting acceleration of the movable member is lessened for preventing overshoot. The subject invention represents an improvement in such a servo system.

SUMMARY OF THE INVENTION

A servo system for controlling the energization of an actuator employed to move a member in response to a desired position signal, said system including a position sensing means generating a position error signal responsive to the present position of the movble member, a first circuit for transmitting a signal to the actuator responsive in magnitude to the derivative of the error signal thereby indicating the velocity of the movable member and a second circuit for transmitting to the actuator a signal responsive to the magnitude of the error signal, said second circuit including means for attenuating the position error signal responsive to the magnitude of that error signal.

DESCRIPTION OF THE INVENTION

DESCRIPTION OF THE INVENTION

Figure 1:
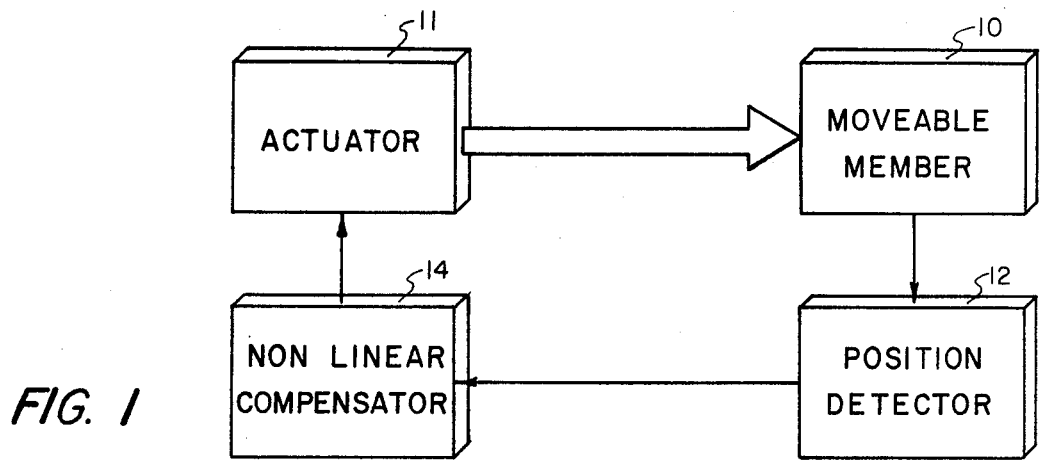
FIG. 1 shows a servo system suitable for incorporation of the present invention.

In FIG. 1 is shown a servo system for positioning a movable member 10. An actuator 11 is connected to the movable member and acts responsive to an error signal generated by a position detector 12 to move the movable member to a desired position. Thus the position detector senses the position of the movable member in any of several suitable ways and generates an error signal which is used to control the energization of the actuator.

Past experience shows that with larger error signals, the movable member is accelerated to higher velocities during actuation towards the desired position. As the movable member is accelerated to these greater velocities, there is a greater chance of overshoot. However any uniform attenuation of error signal while serving to prevent overshoot, also decreases the stiffness of the system because of a diminishing of the smaller error signals also. Thus offset of the system is increased due to slight forces acting on the movable member.

Figure 2:
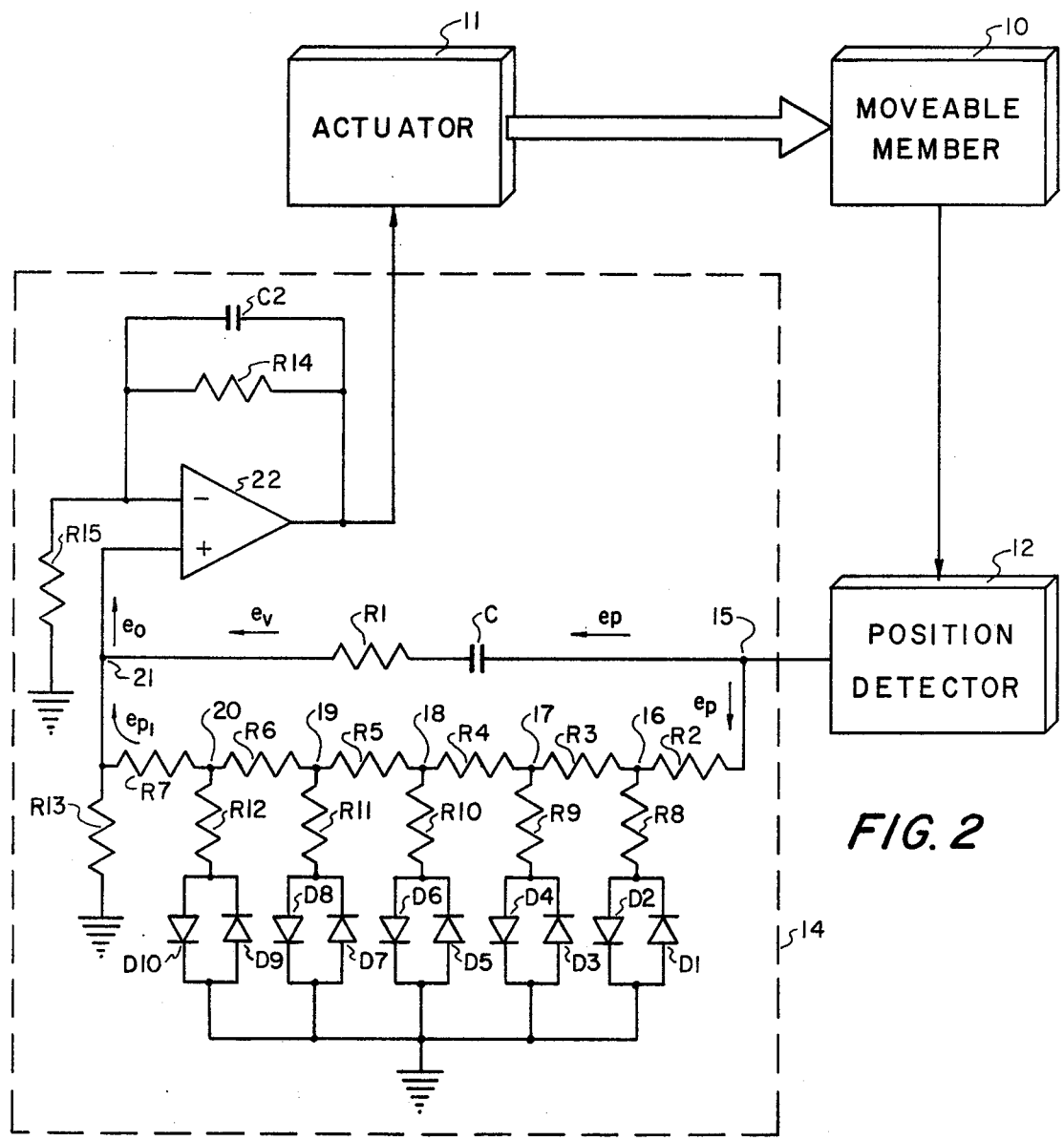
FIG. 2 shows a servo system similar to FIG. 1 with the subject invention incorporated therein.

In accordance with the present invention, there is provided a non-linear compensator 14 which receives the error signal from the position detector and attenuates the error signal an amount responsive to the magnitude of the error signal thereby reducing overshoot of the movable member as previously discussed. However because smaller magnitude error signals are reduced proportionally less, the overall offset on the capability of the system to place the movable member at the desired position is not diminished. The compensator is shown in the circuit of FIG. 2. In this circuit the error signal is generated by the position detector and fed to the non-linear compensator 14. This error signal is divided at the juncture 15 and in a first circuit is supplied to a capacitor C and a resistor R1 which generates a signal $E_V$ which is the derivative of the error signal $E_P$. Being the derivative of the error signal, this signal is therefore proportional to the velocity of the movable member.

There is also supplied a second circuit receiving the error signal $E_P$ which circuit serves to attenuate this error signal in a non-linear manner proportional to the magnitude of the error signal. For this purpose, there is connected the resistors $R_2$, $R_3$, $R_4$, $R_5$, $R_6$ and $R_7$ in series to receive the error signal $E_P$. At each of the junctures 16, 17, 18 19 and 20 between adjacent resistors $R_2$ through $R_7$, respectively, there is connected a circuit leading to ground through a series of opposing connected diodes $D_1$ and $D_2$, $D_3$ and $D_4$, $D_5$ and $D_6$, $D_7$ and $D_8$, $D_9$ and $D_{10}$. In series connection with these diode pairs are resistors $R_8$, $R_9$, $R_{10}$, $R_{11}$ and $R_{12}$, respectively. The pairs of diodes serve to initiate conduction at voltage levels above their threshold of voltage to divert a portion of the error signal $E_P$ to ground.

For lower values of $E_P$ none of the diodes will conduct and the error signal $E_{P1}$ supplied to the junction 21 will approximate the magnitude of $E_P$ with some loss in magnitude due to the voltage drop across the series-connected resistors $R_2$ through $R_7$. However, as the error signal $E_P$ becomes larger, the threshold voltage of the diodes $D_1$ and $D_2$ will ultimately be reached when the magnitude of $E_P$ reaches a value of that threshold voltage plus the voltage drop across the resistor $R_2$. There the diodes $D_1$ and $D_2$ are rendered conductive thereby diverting a portion of the error signal to ground depending upon the relative values of the resistors $R_2$ through $R_7$ and the resistors $R_8$ through $R_{12}$.

Thus in the normal operation the diodes $D_1$ and $D_2$ will initially start to conduct as the magnitude of the error signal $E_P$ increases. However due to the voltage drop across the resistors $R_2$ and $R_3$, a lower voltage will be impressed on the diode pair $D_3$ and $D_4$ such that they will not initiate conduction until $E_P$ gets larger to equal their threshold voltage plus the voltage drops across the resistors $R_2$ and $R_3$. Thereafter the pairs of diodes will conduct at sucessive times as $E_P$ grows in magnitude. Thus it can be seen that as the magnitude of $E_P$ increases, more and more of the diode pairs $D_1$ through $D_{10}$ will be rendered conductive such that more of the error signal $E_P$ will be diverted to ground. There results an attenuation of the error signal $E_P$ proportional to the magnitude of $E_P$ such that $E_{P_1}$ at the juncture 21 is not directly increased as $E_P$ increases in magnitude. Thus the adding of the error signal $E_{P_1}$ with $E_V$ forming the signal $E_O$ which is fed to the amplifier 22 is decreased by an amount proportional to the magnitude of $E_P$. The amplifier 22 has a feedback circuit including the resistor $R_{14}$ and the capacitor $C_2$ and serves to differentially amplify the error signal and supply the amplified and attenuated error signal to the actuator 11.

Figure 3:
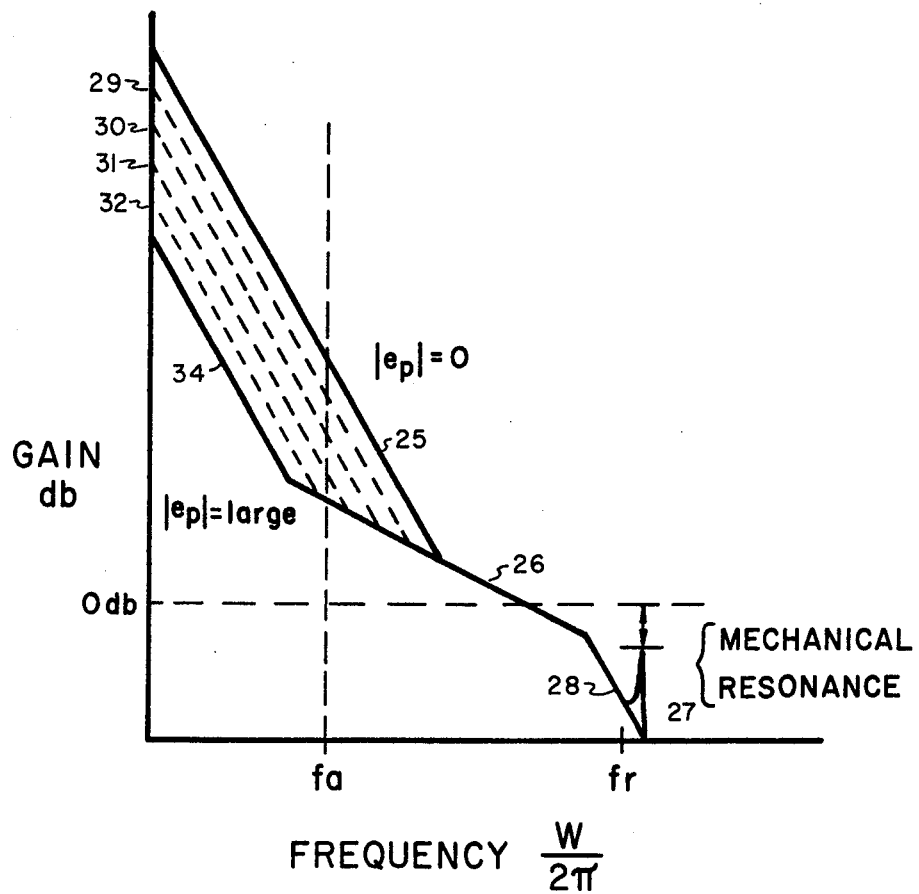
FIG. 3 shows a plot of the gain of the servo system versus frequency for various magnitudes of error signal.

This error signal $E_P$ will be attenuated by larger amounts for greater values of $E_P$ thereby lessening the possibility of overshoot. However no attenuation results for smaller values of $E_P$. Shown in FIG. 3 is a plot of the error signal as it varies with gain of the servo system in db, and the frequency of the error signal.

For a small magnitude of error signal $E_P$, the gain of the system follows the line 25 to the intersection with the line 26 which intersects the 0db line and joins the response line 28. Below the 0db response there is illustrated the mechanical resonance portion 27 of the response curve at frequency $f_y$. However since this response occurs below the 0db no resonance in the servo system results.

As the magnitude of the error signal $E_o$ increases, the diode pairs $D_1$ and $D_2$ through $D_9$ and $D_{10}$ initiate conduction. As a result the gain of the servo system diminishes as indicated by the dotted lines 29, 30, 31, 32 and 34. Each dotted line showing a lower gain response is the response curve for additional diode pairs initiating conduction. For instance for a frequency fa, the smaller the error signal, the larger the gain of the system as indicated by the dotted line 31. With all diode pairs conducting, the response curve follows the lines 34, 26 and 28. Thus the gain of the system diminishes for large values of the error signal $E_o$ to limit overshoot of the servo system. However for higher frequency ranges there is no reduction of gain in the response of the servo system.

The invention claimed:

1. A servo system for controlling the energization of an actuator employed to move a member in response to an energizing signal, said system comprising in combination:

position sensing means for generating an error signal responsive to the present position of said member;

a first circuit for generating a first signal responsive to the velocity of said member;

a second circuit for receiving and attenuating said error signal by an amount proportional to the magnitude of the error signal to generate a second signal;

means for subtracting said first signal from the second signal to generate a differential signal for energization of said actuator.

2. A servo system as defined in claim 1, wherein said second circuit includes a plurality of diodes connected to divert a portion of said error signal each having a different magnitude threshold voltage.

3. A servo system as defined in claim 2 wherein said first circuit includes means for differentiating said error signal to generate said first signal.

4. A servo system as defined in claim 1 wherein said second circuit includes a plurality of resistors in series connection with diodes connected between the junctures of said resistors and ground thereby to conduct at varying magnitudes of the error signal to divert a portion thereof to ground.

* * * * *